United States Patent

[11] 3,623,778

[72] Inventor Robert A. Horvath
     Dayton, Ohio
[21] Appl. No. 877,609
[22] Filed Nov. 18, 1969
[45] Patented Nov. 30, 1971
[73] Assignee General Motors Corporation
     Detroit, Mich.

[54] PRESSURE MODULATOR WITH ADDITIONAL SUPPORT PRESSURE
6 Claims, 1 Drawing Fig.

[52] U.S. Cl. .................................................. 303/21 F,
     137/492.5, 188/181 A, 303/10, 303/40, 303/61
[51] Int. Cl. ................................................ B60t 8/12
[50] Field of Search .......................................... 137/492.5;
     303/21, 24, 6, 10, 61–63, 68–69, 40; 188/181

[56] References Cited
UNITED STATES PATENTS

| | | | |
|---|---|---|---|
| 3,276,822 | 10/1966 | Lister et al. ................... | 303/21 F X |
| 3,480,335 | 11/1969 | Inada ........................... | 303/21 F |

Primary Examiner—Milton Buchler
Assistant Examiner—John J. McLaughlin
Attorneys—W. E. Finken and D. D. McGraw ABSTRACT: A brake apply pressure modulator in a vehicle wheel brake antilock system which receives signals from an antilock sensor and signal generator and acts to limit, decrease, and permit increase of the brake apply pressure in accordance with the antilock signals. Additional support pressure is provided in accordance with the brake apply pressure existing so as to prevent the modulator from functioning as a brake apply pressure limiter when the vehicle is being braked at high brake pressures without requiring the antilock functions to be operative.

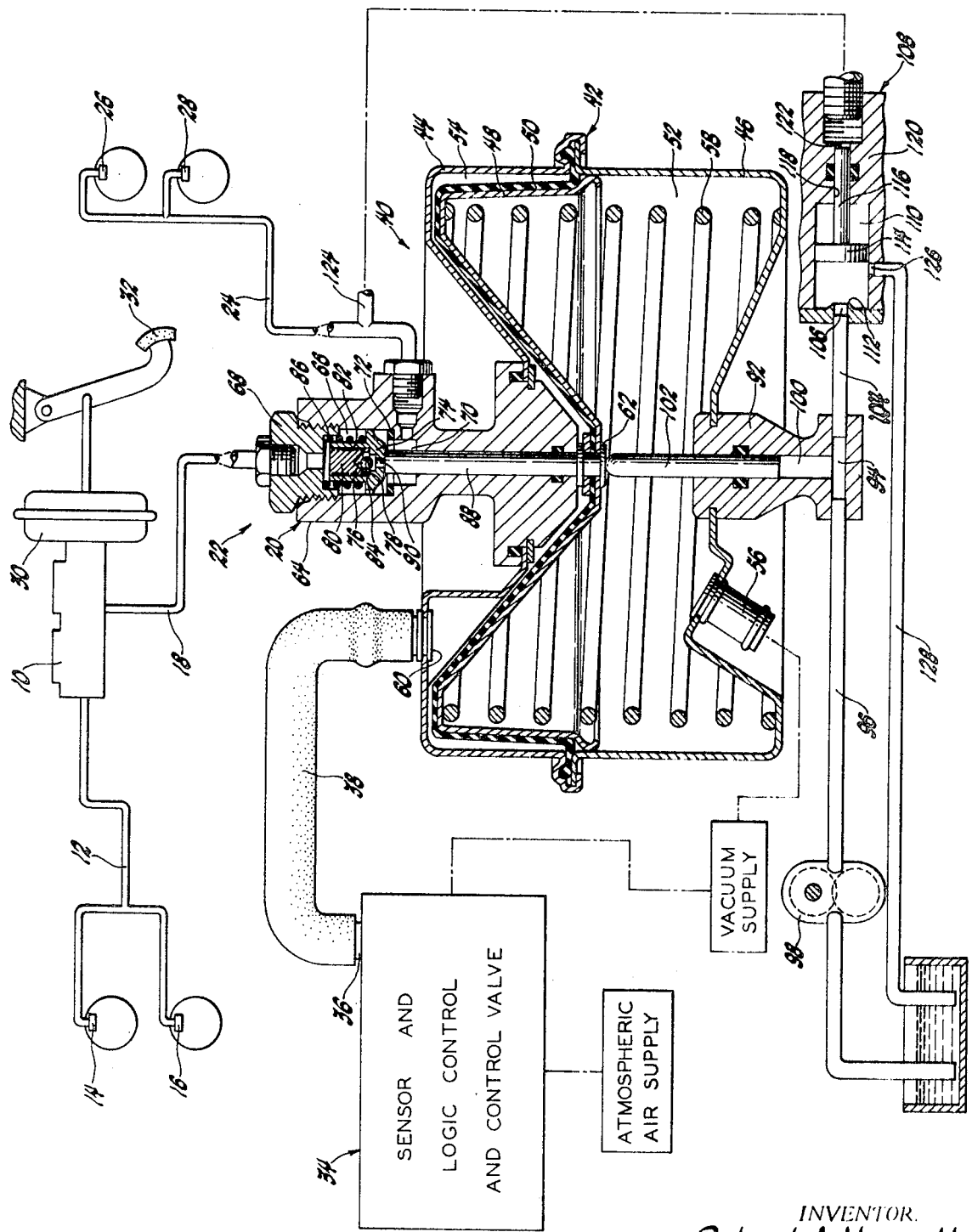

PRESSURE MODULATOR WITH ADDITIONAL SUPPORT PRESSURE

The invention relates to a pressure modulator and more particularly to one which is installed fluidly intermediate a master cylinder and a vehicle wheel brake assembly and acts in accordance with signals delivered thereto to limit and release to a lesser value and to permit an increase in the brake apply pressure in a cycle of operation which prevents the wheel brake from locking up and maintains a more effective vehicle braking force. The invention is embodied in an improvement to the modulator disclosed and claimed in my U.S. Pat. No. 3,401,987. The modulator is illustrated as being embodied in an antilock system of the type disclosed and claimed in U.S. Pat. No. 3,441,320. The modulator may also be used in the system of my U.S. Pat. No. 3,433,535. It may likewise be utilized in other systems which generate signals for controlling the brake apply pressure. The modulator is illustrated and described as a vacuum suspended unit having a pneumatic section and a hydraulic section. The hydraulic section is connected between the master cylinder and the vehicle wheel brake or brakes being controlled. In the particular system illustrated the modulator controls the brake apply pressure to both rear brakes. However, it is within the scope of the invention that the modulator can be utilized to control the brake apply pressure to any single brake or any combination of brakes desired. The modulator includes a fluid displaceable piston connected to control the sequential seating and unseating action of brake apply pressure controlling check valves and also to increase the effective volume in the vehicle wheel brake while the valves are seated so as to release that pressure to a lower value. The lower value is established by the signals generated in accordance with the antilock sensing mechanism. Thus the modulator is particularly adapted to operate with a system utilizing extremal antilock control. The piston is so arranged as to be moved outwardly to increase brake apply volume by action of the brake apply pressure on the piston and is limited in such movement by a power wall. The movement and position of the power wall is controlled by the generated signals. Even though the power wall should be moved to a position which would tend to establish a subatmospheric pressure in the vehicle wheel brake, the piston will move only to the extent that the brake apply pressure is reduced to substantially atmospheric pressure, thereby preventing the possible introduction of air in the brake system. This is accomplished by having the piston associated with the power wall only in a freely abutting relationship. When the brakes are operating without requiring any antilock control, additional support pressure is provided to exert additional force on the modulator fluid displaceable piston to prevent movement of that piston by hydraulic line pressure. This prevents the modulator from functioning as a brake apply pressure limiter at a pressure level lower than that which may be accepted by the wheel brakes, and increase the value of the maximum pressure which may be applied.

IN THE DRAWING

The single FIGURE includes a schematic illustration of a vehicle wheel brake antilock system including a modulator embodying the invention, with parts broken away and in section.

The vehicle wheel brake system includes a master cylinder 10 illustrated as being of the dual pressure chamber type with the front chamber connected through conduit means 12 to the front wheel brakes 14 and 16. The rear chamber of the master cylinder 10 is schematically illustrated as being connected by conduit 18 to the hydraulic brake fluid section 20 of the modulator assembly 22. The hydraulic section 20 is in turn connected by conduit 24 to the rear vehicle wheel brakes 26 and 28. The master cylinder is illustrated as being operated by a brake booster 30 which is controlled by the vehicle operator through movement of the brake pedal 32.

A wheel antilock sensor, logic control valve assembly 34 is schematically illustrated. In the particular system shown in the drawing, the unit may be driven by one or more vehicle wheels, or by the drive shaft of the vehicle connected to the vehicle rear wheels, since the vehicle rear wheels are being controlled by the modulator 22. If, for example, a modulator were to be supplied for each vehicle wheel, the vehicle wheel drive would be connected to the particular wheel being controlled by the modulator. The sensor and signal generator 34 may be of any of the types disclosed and claimed in the above-noted patents. The signal-generating portion of the assembly 34 is connected to a supply of atmospheric air and a supply of vacuum, as schematically illustrated, and generates pressure signals in the signal generator outlet 36, depending upon the condition of the vehicle wheel or wheels driving the sensor portion of the assembly. As is described in greater detail in my patents referred to above, under normal operating conditions the signal in outlet 36 is vacuum from the vacuum supply. When the vehicle wheel slip ratio increases to an extent portending a vehicle wheel lock condition, sufficient atmospheric air pressure is connected to the outlet 36 to raise the absolute signal pressure to a point intermediate the vacuum pressure and atmospheric air pressure. The extent of this absolute pressure increase is determined by the operating condition of the vehicle wheel or wheels being sensed. During a portion of the operating cycle, when this absolute pressure has increased and acted through the modulator to release the wheel brake apply pressure to a lower value to permit a decrease in wheel slip, the signal pressure is upon other predetermined conditions of the vehicle wheel, returned to the vacuum supply pressure. The pressure signals from the assembly 34 are transmitted to the modulator 22 through the signal conduit 38.

The modulator assembly 22 has a pneumatic section 40 which receives the signals from assembly 34 and includes a housing 42 formed by an upper section 44 and a lower section 46. A piston 48 is positioned within the housing and cooperates with a diaphragm 50 to provide a power wall which divides the housing into a vacuum chamber 52 and a variable pressure chamber 54. Vacuum chamber 52 is connected through suitable conduit means 56 to a vacuum supply so that chamber 52 is always at the pressure found in the vacuum supply. The vacuum supply may be the vehicle engine intake manifold, and therefore chamber 52 is always at manifold vacuum when the engine is running. Of course, when the engine is not running, chamber 52 will be at atmospheric pressure in the absence of a vacuum-accumulating system. A power wall spring 58 is contained in chamber 52 and urges the piston 48 and the diaphragm 50 in a direction tending to decrease the volume of chamber 54. Chamber 54 is connected through inlet 60 with the signal conduit 38 and therefore the pressure in chamber 54 varies in accordance with the signals generated by assembly 34. In the normal condition of brake operation, the pressure signal transmitted to chamber 54 is also the vacuum supply pressure, and therefore the pressure forces are balanced across diaphragm 50. This permits compression spring 58 to hold the power wall in the position shown in the drawing. The power wall has a fastener 62, which may be a rivet, holding the piston 48 and the diaphragm 50 together and having one rivet end extending into chamber 54 acting as a free abutting element for a portion of the hydraulic section 20 described below. The other end of rivet 62 extends into chamber 52 and acts as a free abutting element for the added support pressure piston to be described.

The hydraulic section 20 includes a housing 64 mounted in and forming a portion of the pneumatic housing upper section 44. The housing 64 has an inlet chamber 66 fluid connected with brake pressure conduit 18 through cap 68. It also has an outlet chamber 70 fluid connected to conduit 24. Chambers 66 and 70 are separated by primary valve seat 72 and the primary check valve 74. The primary check valve is mounted in chamber 66 so that in its lower position it is seated against valve seat 72 and prevents fluid from flowing between chambers 66 and 70 around the periphery of the check valve. The check valve 74 is generally annular and contains a secondary check valve chamber 76. The lower end of chamber 76 is formed to provide an annular valve seat 78. The upper portion of chamber 76 is partially closed by a restriction plug 80 so that chamber 76 is fluid-connected with inlet chamber 66 by means of a restrictive pressure flow passage 82. An opening is provided through the annular valve seat 78 which fluid connects valve chamber 76 with outlet chamber 70. The secondary check valve 84 is illustrated as being a ball-type valve contained in chamber 76 and freely movable therein so that it may be seated on valve 78 or unseated therefrom. A primary check valve spring 86 is positioned in chamber 66 and continually urges the primary check valve 74 toward seating engagement with its seat 72.

A fluid displaceable means in the form of piston 88 is reciprocably mounted in a portion of housing 64 so that it extends into outlet chamber 70 through a wall of that chamber. The upper end of piston 88 is provided with a pin 90 which extends through the secondary valve seat 78 so that the end of the piston forming a shoulder at the base of the pin can engage the lower side of the check valve 74 while the pin 90 extends upwardly a sufficient distance to positively hold the secondary check valve 84 in an unseated position. The other end of piston 88 extends through the housing 64 into the variable pressure chamber 54 and into free abutting relationship with the fastener 62. It can thus be seen that only compressive forces can be transmitted between the pneumatic section power wall and the piston 88.

The modulator pneumatic section 40 has a housing 92 mounted therein and forming a portion of the pneumatic housing lower section 46. Housing 92 has a through passage 94 therein to which is connected at one end the pressure conduit 96 from the output of a hydraulic pump such as the power steering pump 98. Chamber 100 is formed in housing 92 and is connected with passage 94. The added support pressure piston 102 is reciprocably received in chamber 100 and extends out through modulator chamber 52 and into engagement with rivet 62. The other end of passage 94 is connected through conduit 104 to port 106 of valve assembly 108. Port 106 opens into one end of chamber 110 of assembly 108 and has a valve seat 112 surrounding it. Valve 114 is reciprocably received in chamber 110 and has a stem 116 extending through a bore 118 of the valve housing 120 to provide a piston with its face exposed to pressure in housing chamber 122. Conduit 124 connects conduit 24 with chamber 122 to exert wheel brake pressure against the face of stem piston 116. A port 126 in the sidewall of chamber 122 is connected with the power steering pressure return conduit 128. Valve 114 is urged to the right by pump pressure through port 106 and, when there is no wheel brake pressure, the valve clears port 126 valve clears port 126 so that the two ports are in open fluid communication. As the modulated brake line pressure increases it moves valve 114 leftwardly to restrict port 126. Pressure is therefore increased between the valve and the pump, causing an increase in pressure in chamber 100 which acts on the added support pressure piston 102 and increases the support pressure of the modulator.

In the normal condition of brake operation the position of the various elements of the modulator are as shown in the drawing. Thus chambers 52 and 54 are at vacuum supply pressure and spring 58 is holding the power wall in its upward condition so that it positively urges piston 88 upwardly with a sufficient force to hold the primary check valve and the secondary check valve in unseated positions. Therefore the inlet chamber 66 is freely fluid connected to the outlet chamber 70, and the brake apply pressures received by the rear brakes 26 and 28 are those pressures generated by the master cylinder 10 and transmitted through conduit 18. The pressure applied to the wheel cylinders 26 and 28 is the same as the line pressure in conduit 18 provided by the master cylinder. This pressure acts against piston 88 and when it reaches a sufficiently high value it overcomes the force of spring 58, moving piston 48 downwardly, thus effectively limiting the pressure available to the wheel cylinders 26 and 28. This may occur at about 1,200 p.s.i., for example. By providing the support pressure in chamber 100 the line pressure urging piston 48 downwardly is resisted in accordance with the wheel cylinder pressure, so that a higher line pressure may be delivered to the wheel cylinders, assuming no undesirable wheel slip conditions. This additional available pressure may be as much as 50 percent greater than before.

If the assembly 34 senses an incipient vehicle wheel brake locking condition, a pressure signal is transmitted through conduit 38 to chamber 54 as an absolute pressure increase. The unbalance of pressures across diaphragm 50 will become sufficient to overcome the forces of support pressure in chamber 100 acting on piston 102 and of spring 58 and, aided by hydraulic pressure acting across the cross section of piston 88 as well as the preload and compressive force of valve spring 86, the power wall of the pneumatic section moves downwardly, permitting piston 88 to likewise move downwardly. The primary check valve 74 first seats on valve seat 72, and slight additional downward movement of piston 88 permits the secondary check valve 84 to seat on its seat 78. Thus the master cylinder generated pressure is prevented from further increasing the rear brake apply pressure. Further downward movement of piston 88, as permitted by movement of diaphragm 50 and piston 48, causes the upper end of piston 88 to be disengaged from the valve mechanism and to increase the volume of chamber 70, thereby decreasing the brake apply pressure to the rear brakes. The decreased wheel cylinder brake apply pressure acts on piston 116 to provide a lesser force opposing rightward movement of valve 114 by pump pressure, thereby allowing the valve to move to open port 126 slightly, and decreasing support pressure in chamber 100. The amount of brake apply pressure released is determined by the signal generated by assembly 34, which positions the pneumatic power wall. If this signal should be such that the piston 88 is moved downwardly to a point where brake apply pressure is substantially zero, the piston 88 will cease its movement even though the power wall may move downwardly further. This effectively prevents the introduction of air in the rear brakes 26 and 28 and brake conduit 24 by preventing a subatmospheric brake apply pressure from being generated. In the usual operation of the system, however, the rear brake apply pressure is merely released to a lower pressure which is sufficient to permit the rear wheels to accelerate with consequent decrease in wheel slip. The power wall will then maintain this position of piston 88 in response to the pressure signal from assembly 34 until the vehicle wheel acceleration changes sufficiently to cause the signal to again decrease in absolute pressure by having the signal generator outlet again connected with the vacuum supply. The signal will then again lower the absolute pressure in chamber 54, decreasing the pressure differential across the power wall and thereby permitting spring 58 to move the power wall upwardly. This movement will positively move piston 88 upwardly, decreasing the volume of outlet chamber 70 and therefore increasing the brake apply pressure at the rear brakes 26 and 28. When the piston 88 moves upward sufficiently, the outer end of pin 90 will engage and unseat the secondary check valve 84, fluid-connecting the inlet chamber 66 and the outlet chamber 70 through the restrictive passage 82. Thus if the master cylinder generated pressure in conduit 18 imposed on inlet chamber 66 is still substantially greater than the brake apply pressure in outlet chamber 70, a pressure surge to the wheel brake will be effectively prevented. This is desirable since a sudden high-rate change in the brake apply pressure will cause a pressure overshoot that must later be controlled by the system. Further upward movement of piston 88 will cause the piston to engage the lower side of primary check valve 74 in abutting relation and then unseat that vale against the force of the valve spring 86. The inlet and outlet chambers are then again connected in relatively free pressure flow relation. The cycle will be repeated as necessary to prevent the rear brakes from locking and to maintain a more satisfactory braking result.

If the master cylinder generated pressure in conduit 18 is substantially decreased or lessened while the piston 88 is in its downward position, to the extent that the master cylinder generated pressure is less than the brake apply pressure in outlet chamber 70, secondary check valve 84 will immediately open and the pressures will be balanced through the restriction passage 82. If the pressure unbalance is sufficient to overcome the force of primary check valve spring 86, the pressure in chamber 70 will move the check valve 74 upwardly to immediately establish a full pressure flow connection from outlet chamber 70 to inlet chamber 66.

The modulator is constructed so as to permit pressurization of the rear brakes at all times when the wheels are not in an incipient lock condition. Thus, if the vacuum supply is not operative, atmospheric air pressure will be on both sides of diaphragm 50, and spring 58 will still hold piston 88 in the position shown in the drawing. Therefore braking action can be obtained, insofar as the modulator action is concerned, without the presence of vacuum in the system.

If the pump 98 is not operating, the system will still permit as much brake line pressure to be delivered to the wheel cylinders 26 and 28 as would a system without the support pressure feature.

While the modulator is illustrated as adapted for receiving pneumatic pressure signals, it may be constructed to receive other types of signals to be compatible with the particular sensor and signal generator assembly used. Thus the signals may be hydraulic or electrical in nature without departing from the scope of the invention in its broader aspects, and the power section may be of a similar nature.

What is claimed is:

1. In a vehicle brake system having a brake master cylinder and a brake wheel cylinder, a brake pressure modulator having a first piston movable in accordance with a sensed vehicle wheel condition and comprising:

a housing having formed therein a brake pressure inlet chamber connected to receive brake pressure from said master cylinder and a brake pressure outlet chamber connected to provide brake pressure to said brake wheel cylinder, valve means in said housing fluid connected to control brake fluid pressure between said inlet chamber and said outlet chamber, said first piston extending through a wall of said outlet chamber and selectively opening said valve means to permit free brake fluid pressure communication between said inlet chamber and said outlet chamber, means permitting movement of said first piston by brake pressure in said outlet chamber in a direction permitting said valve means to close and to increase the volume of said outlet chamber to decrease outlet chamber brake pressure in response to variations in the sensed vehicle wheel condition, and second piston means having a variable pressure acting thereon controlled by said outlet chamber brake pressure and positioned to act on said last named means for opposing movement of said first piston by brake pressure in said brake pressure outlet chamber.

2. In the vehicle brake system of claim 1, said pressure modulator further comprising:

valve means urged by said outlet chamber brake pressure in a direction to decrease said variable pressure and urged by said outlet chamber brake pressure in a direction to oppose said variable pressure to increase said variable pressure.

3. In the vehicle brake system of claim 2, said variable pressure being received from a pressure source independent of brake pressure in said inlet chamber.

4. In the brake system of claim 1, said pressure modulator further comprising:

a second housing having a pressure chamber therein and said second piston forming a movable chamber wall thereof, a pressure inlet, and a pressure outlet;

a third housing having a valve chamber therein and an open center valve movable in said valve chamber, a valve chamber inlet port fluid pressure connected to said second housing pressure outlet, a valve chamber outlet port connected to a return conduit, a pressure chamber fluid-connected with said first housing pressure outlet chamber, and outlet chamber brake pressure responsive means in said third housing pressure chamber and acting on said valve in opposition to pressure at said valve chamber inlet port to restrict said valve chamber outlet port and vary pressure in said second housing pressure chamber in direct relation to changes in pressure in said first housing pressure outlet chamber.

5. A brake system including a fluid brake pressure modulator having a brake line pressure inlet and a brake actuating pressure outlet, first means responsive to forces generated by opposed fluid pressures for selectively modulating brake line pressure entering said inlet to generate modulated brake actuating pressure at said outlet, and second means responsive to brake actuating pressure at said outlet and generating support pressure acting on said first means in direct pressure relation to brake actuating pressures at said outlet.

6. The brake system of claim 5, said brake line pressure being master cylinder brake supply pressure in the brake system, said brake actuating pressure at said outlet being brake apply pressure;

said first means including a differential pressure operated power wall, a first piston in compressive force transmitting connection with said power wall and exposed to pressure in said outlet, and resilient means acting on said piston through said power wall in opposition to pressure in said outlet;

and said second means including a second piston in compressive force transmitting connection with said power wall having a variable pressure acting thereon and variable in accordance with pressure at said outlet and exerting force on said power wall in opposition to force exerted on said power wall by said first piston.

* * * * *

PO-1050
(5/69)

UNITED STATES PATENT OFFICE
CERTIFICATE OF CORRECTION

Patent No. __3,623,778__  Dated __11-30-71__

Inventor(s) __Robert A. Horvath__

It is certified that error appears in the above-identified patent and that said Letters Patent are hereby corrected as shown below:

Column 1, line 74, after the word "control" insert -- and control --.
    Column 3, line 48, after port 126, first occurrence, delete the words -- valve clears port 126 --.
    Column 4, line 69, the word "vale" should read -- valve --.

Claim 2, line 3, after the word "said" insert the word -- variable -- and delete the words "outlet chamber brake".
    Claim 6, line 52, after the word "wall" insert the word -- and --.

Signed and sealed this 25th day of April 1972.

(SEAL)
Attest:

EDWARD M. FLETCHER, JR.
Attesting Officer

ROBERT GOTTSCHALK
Commissioner of Patents